(12) United States Patent
Nair et al.

(10) Patent No.: US 9,883,330 B2
(45) Date of Patent: Jan. 30, 2018

(54) DEVICE PAIRING USING A SECURE ZONE

(71) Applicant: MOTOROLA SOLUTIONS, INC., Schaumburg, IL (US)

(72) Inventors: Subhash P. Nair, Davie, FL (US); Timothy M. Clay, Lake Worth, FL (US)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 0 days.

(21) Appl. No.: 15/177,044

(22) Filed: Jun. 8, 2016

(65) Prior Publication Data
US 2017/0359674 A1 Dec. 14, 2017

(51) Int. Cl.
| H04B 7/00 | (2006.01) |
| H04W 4/00 | (2009.01) |
| H04W 76/02 | (2009.01) |
| H04W 72/00 | (2009.01) |
| H04W 12/08 | (2009.01) |

(52) U.S. Cl.
CPC ........... *H04W 4/008* (2013.01); *H04W 12/08* (2013.01); *H04W 72/005* (2013.01); *H04W 76/021* (2013.01)

(58) Field of Classification Search
CPC ... H04W 4/008; H04W 12/08; H04W 72/005; H04W 76/021
USPC ........................................................ 455/41.2
See application file for complete search history.

(56) References Cited

U.S. PATENT DOCUMENTS

| 9,191,988 | B2 * | 11/2015 | Newham | ................ H04W 88/04 |
| 2008/0320587 | A1 * | 12/2008 | Vauclair | ................ H04L 41/28 726/17 |
| 2013/0282438 | A1 * | 10/2013 | Hunter | ................... G01S 1/02 705/7.32 |
| 2013/0297422 | A1 * | 11/2013 | Hunter | ............... G06Q 30/0261 705/14.58 |

(Continued)

FOREIGN PATENT DOCUMENTS

| EP | 1655922 | 5/2006 |
| WO | 2007140038 | 12/2007 |
| WO | 2015102890 | 7/2015 |

OTHER PUBLICATIONS

Kumar et al., "A comparative Study of Secure Device Pairing Methods," article (2009) pp. 734-749, Elsevier, https://cis.uab.edu/saxena/docs/kstu-pmc.pdf.

(Continued)

*Primary Examiner* — April G Gonzales
(74) *Attorney, Agent, or Firm* — Michael Best & Friedrich LLP (57) ABSTRACT

A method and system of secure zone pairing. Using the method, a low-power broadcast message is generated by a pairing device and transmitted within a broadcast zone, where the low-power broadcast message includes pairing information. A host device that is within the broadcast zone receives the low-power broadcast message and transmits a first indication that the host device is within the broadcast zone. A guest device that is within the broadcast zone receives the low-power broadcast message and transmits a second indication that the guest device is within the broadcast zone. The method pairs the host device and the guest device based on the pairing information, the first indication, and the second indication.

20 Claims, 4 Drawing Sheets

(56) References Cited

U.S. PATENT DOCUMENTS

| | | | |
|---|---|---|---|
| 2014/0254466 A1* | 9/2014 | Wurster | H04L 12/189 |
| | | | 370/312 |
| 2014/0370879 A1* | 12/2014 | Redding | H04W 4/001 |
| | | | 455/419 |
| 2014/0378056 A1* | 12/2014 | Liu | H04W 4/008 |
| | | | 455/41.2 |
| 2015/0189328 A1* | 7/2015 | Edlis | H04L 65/601 |
| | | | 375/240.28 |
| 2015/0332060 A1 | 11/2015 | Tsumura et al. | |
| 2016/0044443 A1* | 2/2016 | Azizi | H04W 4/008 |
| | | | 455/41.2 |
| 2016/0055428 A1 | 2/2016 | Raina et al. | |

OTHER PUBLICATIONS

PCT/US2017/032757 International Search Report and Written Opinion of the International Searching Authority dated Jul. 19, 2017(12 pages).

* cited by examiner

DEVICE PAIRING USING A SECURE ZONE

BACKGROUND OF THE INVENTION

A variety of data is commonly exchanged via wireless short-range or near-field interconnections, for example, via a Bluetooth® interconnection. To protect private data, many wireless devices are configured to recognize specific devices with which they can establish a connection. The process of establishing a connection between wireless devices is often referred to as "pairing." In many instances, secure pairing schemes involve considerable user interaction. For example, secure pairing schemes may require a user to enter or confirm a passkey on both devices. In other cases, secure pairing schemes may require additional hardware, such as a near-field communication (NFC) chip, microphones, accelerometers, or other devices.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

One embodiment provides a host device including a transceiver and an electronic processor electrically coupled to the transceiver. The electronic processor is configured to receive, from a pairing device via the transceiver, a low-power broadcast message when the host device is within a broadcast zone of the pairing device, the low-power broadcast message including pairing information. The electronic processor is also configured to transmit, via the transceiver, a first indication that the host device is within the broadcast zone of the pairing device after receiving the low-power broadcast message. The electronic processor is further configured to receive, from a guest device via the transceiver, a second indication that the guest device is within the broadcast zone of the pairing device and pair with the guest device based on the pairing information of the low-power broadcast message and the second indication.

Another embodiment provides a method of secure zone pairing including receiving, with a host device, a low-power broadcast message when the host device is within a broadcast zone of a pairing device, the low-power broadcast message including pairing information. The method also includes transmitting, via a transceiver of the host device, a first indication that the host device is within the broadcast zone of the pairing device after receiving the low-power broadcast message. The method further includes receiving, via the transceiver, a second indication that a guest device is within the broadcast zone of the pairing device and pairing, with a processor of the host device, the host device with the guest device based on the pairing information of the low-power broadcast message and the second indication.

Another embodiment provides a system for pairing wireless devices including a pairing device having a transmitter configured to transmit a low-power broadcast message within a broadcast zone having a size. The low-power broadcast message includes pairing information. The system also includes a guest device. The guest device has a first transceiver and is configured to receive the low-power broadcast message and transmit an indication that the guest device is within the broadcast zone after receiving the low-power broadcast message. The system further includes a host device having a second transceiver and is configured to receive the indication and the low-power broadcast message. The host device is further configured to pair with the guest device based on the pairing information of the low-power broadcast message and the indication.

Yet another embodiment provides a method of secure zone pairing including transmitting, with a transmitter of a pairing device, a low-power broadcast message within a broadcast zone having a size, where the low-power broadcast message includes pairing information. The method also includes receiving, with a first transceiver of a guest device within the broadcast zone, the low-power broadcast message and transmitting, with the first transceiver, an indication that the guest device is within the broadcast zone after receiving the low-power broadcast message. The method further includes receiving, with a second transceiver of a host device within the broadcast zone, the indication and the low-power broadcast message and pairing the host device with the guest device based on pairing information of the low-power broadcast message and the indication.

Figure 1:
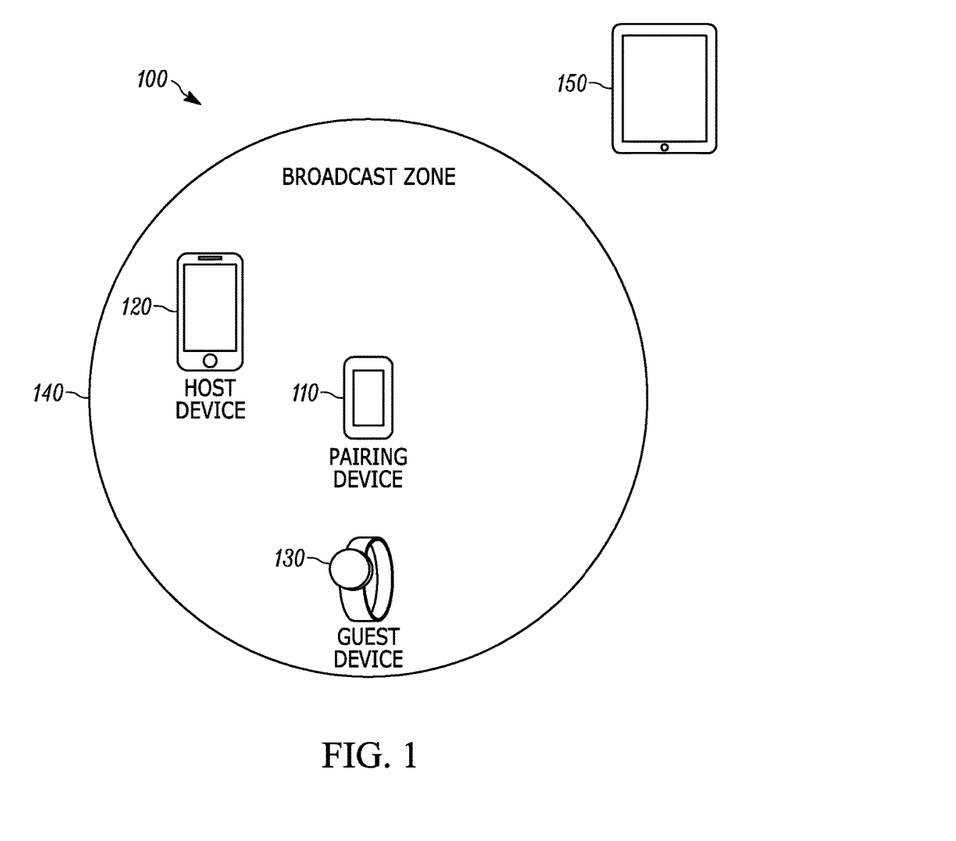
FIG. 1 is a diagram of a system for pairing wireless devices in accordance with some embodiments.

FIG. 1 is a diagram of a system 100 for pairing wireless devices. In the example illustrated, the system 100 includes a pairing device 110, a host device 120, and a guest device 130. The pairing device 110 generates a low-power wireless signal including a low-power broadcast message that is transmitted within a broadcast zone 140. The low-power broadcast message may include pairing information, for example, a service identifier and a passkey.

The host device 120 and the guest device 130 are devices that may be paired with each other to exchange information without using wires or cables. Therefore, they are referred to as "wireless devices." The host device 120 may be, for example, a mobile two-way radio, a smart telephone, or other similar device. The guest device 130 may be for example, a Bluetooth® headset, a smart watch, wireless touch pad, or other similar device. In some embodiments, the functionality of the host device 120, as described herein, may be performed by the guest device 130 and the functionality of the guest device 130, as described herein, may be performed by the host device 120. The host device 120 and the guest device 130 are configured to receive the low-power broadcast message when they are within the broadcast zone 140. A device outside the broadcast zone 140, for example, the device 150 does not receive the low-power broadcast message.

The size of the broadcast zone 140 is adjustable based on the strength of the low-power wireless signal generated by the pairing device 110. As such, the size of the broadcast zone 140 may be increased or decreased based on the strength of the wireless signal generated by the pairing device 110. That is, when the power of the wireless signal is increased, the area covered by the broadcast zone 140 is increased. Similarly, when the power of the wireless signal is decreased, the area covered by the broadcast zone 140 is decreased.

FIG. 1 illustrates only one exemplary embodiment of a system 100 for pairing wireless devices. In other embodiments, the system 100 may include more of fewer components and may perform functions that are not explicitly described herein.

Figure 2:
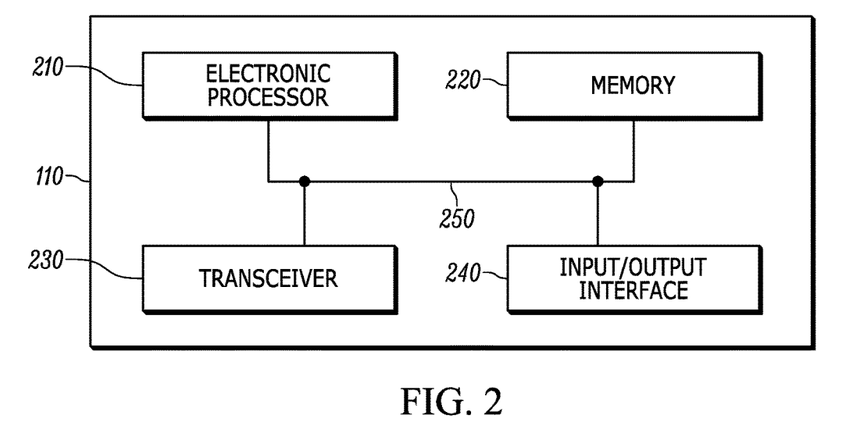
FIG. 2 is a diagram of a pairing device in accordance with some embodiments.

FIG. 2 is a diagram of one embodiment of the pairing device 110. In the example illustrated, the pairing device 110 includes an electronic processor 210, a memory 220, a transceiver 230, and an optional input/output interface 240. The electronic processor 210, the memory 220, the transceiver 230, and the input/output interface 240 communicate over one or more control and/or data buses (for example, a communication bus 250). FIG. 2 illustrates only one exemplary embodiment of the pairing device 110. The pairing device 110 may include more or fewer components and may perform functions other than those explicitly described herein.

In some embodiments, the electronic processor 210 is implemented as microprocessor with separate memory, such as the memory 220. In other embodiments, the electronic processor 210 may be implemented as a microcontroller (with memory 220 on the same chip). In other embodiments, the electronic processor 210 may be implemented using multiple processors. In addition, the electronic processor 210 may be implemented partially or entirely as, for example, a field-programmable gate array (FPGA), an application specific integrated circuit (ASIC), and the like and the memory 220 may not be needed or be modified accordingly. In the example illustrated, the memory 220 includes non-transitory, computer-readable memory that stores instructions that are received and executed by the electronic processor 210 to carry out functionality of the pairing device 110 described herein. The memory 220 may include, for example, a program storage area and a data storage area. The program storage area and the data storage area may include combinations of different types of memory, such as a read-only memory and random-access memory.

The transceiver 230 enables wireless communication from the pairing device 110 to, for example, the host device 120 and the guest devices 130 that are within the broadcast zone 140. In other embodiments, rather than the transceiver 230, the pairing device 110 may include separate transmitting and receiving components, for example, a transmitter, and a receiver. In yet other embodiments, the pairing device 110 may only include a transmitter that transmits the low-power broadcast message.

The input/output interface 240 may include one or more input mechanisms (for example, a touch pad, a button, a knob, and the like), one or more output mechanisms (for example, a display, a speaker, light emitting diodes (LEDs), and the like), or a combination thereof or a combined input and output mechanism such as a touch screen.

As described above, the pairing device 110 is configured to generate a low-power wireless signal. The pairing device 110 transmits the low-power wireless signal including the low-power broadcast message using the transceiver 230 or a transmitter of the pairing device 110. In some embodiments, the pairing device 110 is compliant with Bluetooth® Low-Energy (LE) standards. Specifications for the Bluetooth® Low-energy standards can be found at https://www.bluetooth.com/specifications/adopted-specifications. Accordingly, the pairing device 110 may have a maximum transmit power of 10 milli-Watts (mW). Further, the transmit power of the pairing device 110 may be configurable to adjust the size of the broadcast zone 140. For example, the transmit power of the pairing device 110 may be varied between 0.01 mW and 10 mW. In some embodiments, the transmit power of the pairing device 110 may be under 1 mW to achieve a secure zone with a radius less than 1 meter (m).

In some embodiments, the pairing device 110 is a device solely operating as a pairing device. In other embodiments, the pairing device 110 is a wireless communication capable device configured to function as a pairing device. For example, the functionality of the pairing device 110 may be built into a mobile two-way radio, a smart telephone, a wireless-capable universal serial bus (USB) dongle that can be plugged into a laptop, and the like. In yet other embodiments, the functionality of the pairing device 110 may be built into the host device 120 or the guest device 130.

Figure 3:
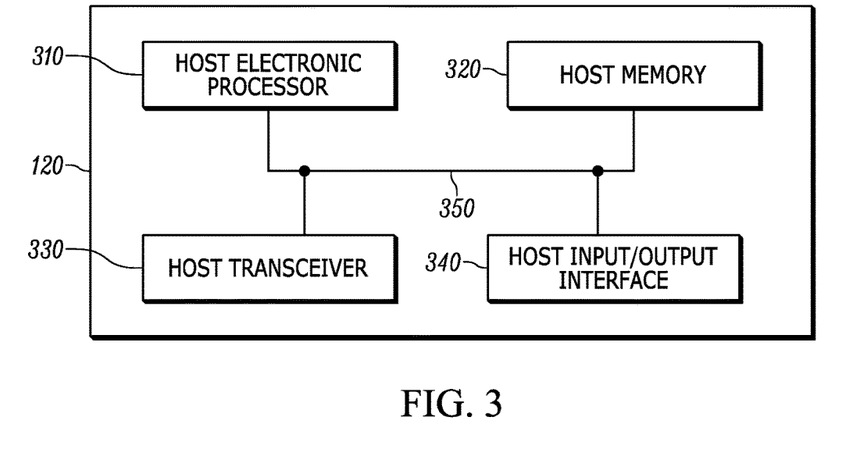
FIG. 3 is a diagram of a host device in accordance with some embodiments.

FIG. 3 is a diagram of one embodiment of the host device 120. In the example illustrated, the host device 120 includes a host electronic processor 310, a host memory 320, a host transceiver 330, and a host input/output interface 340. The host electronic processor 310, the host memory 320, the host transceiver 330, and the host input/output interface 340 communicate over one or more control and/or data buses (for example, a host communication bus 350). FIG. 3 illustrates only one exemplary embodiment of the host device 120. The host device 120 may include more or fewer components and may perform functions other than those explicitly described herein.

The host electronic processor 310 may be implemented in various ways including ways that are similar to those described above with respect to the electronic processor 210. Likewise, the host memory 320 may be implemented in various ways including ways that are similar to those described with respect to the memory 220. The host memory 320 may store instructions that are received and executed by the host electronic processor 310 to carry out functionality described herein.

The host transceiver 330 enables wireless communication for the host device 120, for example, with the pairing device 110 and/or the guest device 130. In other embodiments, rather than a host transceiver 330, the host device 120 may include separate transmitting and receiving components, for example, a transmitter, and a receiver.

The host input/output interface 340 may include one or more input mechanisms (for example, a touch pad, a keypad, a button, a knob, and the like), one or more output mechanisms (for example, a display, a speaker, and the like), or a combination thereof or a combined input and output mechanism such as a touch screen.

Figure 4:
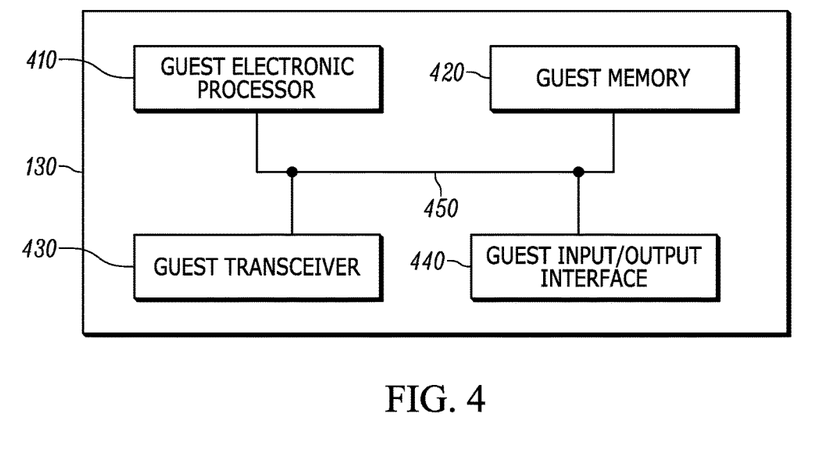
FIG. 4 is a diagram of a guest device in accordance with some embodiments.

FIG. 4 is a diagram of one embodiment of the guest device 130. In the example illustrated, the guest device 130 includes a guest electronic processor 410, a guest memory 420, a guest transceiver 430, and a guest input/output interface 440. The guest electronic processor 410, the guest memory 420, the guest transceiver 430, and the guest input/output interface 440 communicate over one or more control and/or data buses (for example, a guest communication bus 450). FIG. 4 illustrates only one exemplary embodiment of the guest device 130. The guest device 130 may include more or fewer components and may perform functions other than those explicitly described herein.

The guest electronic processor 410 and the guest memory 420 may be implemented in various ways including ways that are similar to those described above with respect to other processors and memory. Likewise, the guest memory 420 may store instructions that are received and executed by the guest electronic processor 410 to carry out functionality described herein.

The guest transceiver 430 enables wireless communication for the guest device 130, for example, with the pairing device 110 and/or the host device 120. In other embodiments, rather than a guest transceiver 430, the guest device 130 may include separate transmitting and receiving components, for example, a transmitter, and a receiver.

The guest input/output interface 440 may include components similar to those described with respect to the host input/output interface 340.

Figure 5:
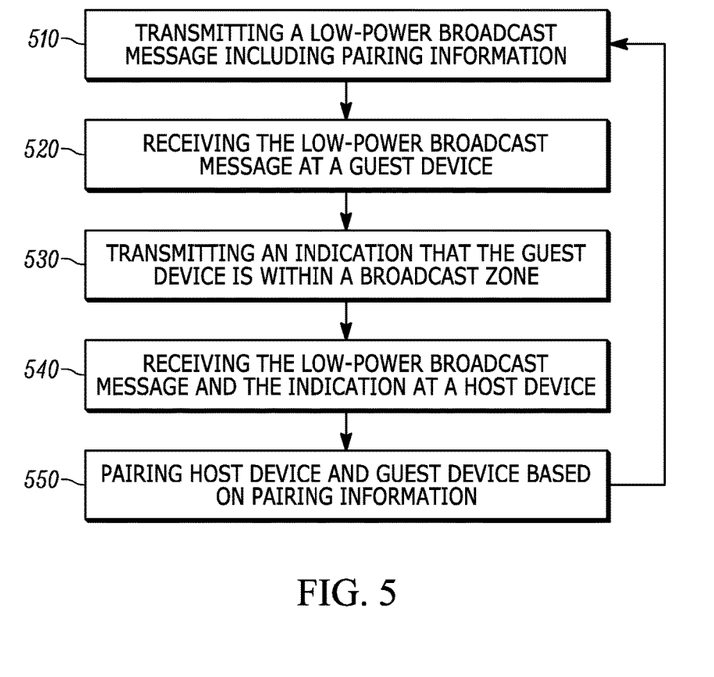
FIG. 5 is a flowchart of a method of secure zone pairing in accordance with some embodiments.

FIG. 5 is a flowchart illustrating one example method 400 of secure zone pairing. As illustrated in FIG. 5, the method 500 includes transmitting, with the pairing device 110, a low-power broadcast message within the broadcast zone 140 (at block 510). The low-power broadcast message includes pairing information that is used by the host device 120 to pair with the guest device 130. The pairing device 110 transmits the low-power broadcast message with the transceiver 230 or a transmitter of the pairing device 110.

The pairing information includes, for example, a pairing service identifier, a passkey, and a timeout value. The pairing service identifier may be a service identifier assigned to secure zone pairing service and provided to devices capable of secure zone pairing. In some embodiments, the pairing service identifier allows other devices, such as the host device 120 and the guest device 130 to recognize the pairing device 110 and initiate a secure zone pairing operation. The passkey is, for example, a random number generated by the pairing device 110 to be exchanged between the host device 120 and the guest device 130. The timeout value specifies the amount of time after which the passkey expires. Accordingly, the pairing device 110 may generate a new passkey after an old passkey expires. For example, the pairing device 110 may generate a new passkey every one minute.

The guest device 130 receives the low-power broadcast message when the guest device 130 is within the broadcast zone 140 (at block 520). The guest device 130 receives the low-power broadcast message via the guest transceiver 430 (for example, a first transceiver) of the guest device 130. In some embodiments, the guest device 130 receives a user input to enable the secure zone pairing mode. In these embodiments, the guest device 130 is configured to receive the low-power broadcast message when in the secure zone pairing mode.

After receiving the low-power broadcast message, the guest device 130 transmits an indication that the guest device 130 is within the broadcast zone 140 (at block 530). The guest device 130 transmits the indication via the guest transceiver 430 (that is, a first transceiver) of the guest device 130. When in the broadcast zone 140, the guest device 130 transmits, for example, a service identifier, a guest device identifier, and a flag. The service identifier indicates that the device is capable of secure zone pairing. In some embodiments, the service identifier may be the service identifier received as part of the pairing information. The guest device identifier includes identifying information about the guest device 130 that enables other devices, such as the host device 120 to pair with the guest device 130. The guest device identifier is, for example, a serial number assigned to the guest device 130 or other identifying information of the guest device 130. The flag indicates whether the guest device 130 is currently within the broadcast zone 140. The indication may include the service identifier, the guest device identifier, and the flag. However, in some implementations, the indication may include only the flag indicating that the guest device 130 is within the broadcast zone 140. In some embodiments, the guest device 130 transmits the indication only when in the secure zone pairing mode.

The host device 120 receives the low-power broadcast message from the pairing device 110 and the indication from the guest device 130 when the host device 120 is within the broadcast zone 140 (at block 540). The host device 120 receives the indication and the low-power broadcast message via the host transceiver 330 (for example, a second transceiver). In some embodiments, the host device 120 receives a user input to enable the secure zone pairing mode. In these embodiments, the host device 120 is configured to receive the low-power broadcast message when in the secure zone pairing mode.

In some embodiments, the host device 120 also transmits an indication (for example, a third indication) that the host device 120 is within the broadcast zone 140. The indication transmitted by the host device 120 may include information similar to that described above with respect to the indication transmitted by the guest device 130. In some embodiments, the host device 120 transmits the indication only when in the secure zone pairing mode.

The host device 120 pairs with the guest device 130 based on the pairing information included in the low-power broadcast message received from the pairing device 110 and the indication received from the guest device 130 (at block 550). That is, the host device 120 establishes a connection with the guest device 130 by exchanging, without user interaction, the passkey included in the low-power broadcast message when the guest device 130 and host device 120 are within the broadcast zone 140. The host device 120 initiates the passkey exchange when the indication received from the guest device 130 indicates that the guest device 130 is within the broadcast zone 140. Similarly, the guest device 130 accepts the passkey exchange when the indication received from the host device 120 indicates that the host device 120 is within the broadcast zone 140. The pairing initiated is, for example, utilizing Classic Bluetooth® pairing, Wi-Fi™ direct pairing, and the like.

Figure 6:
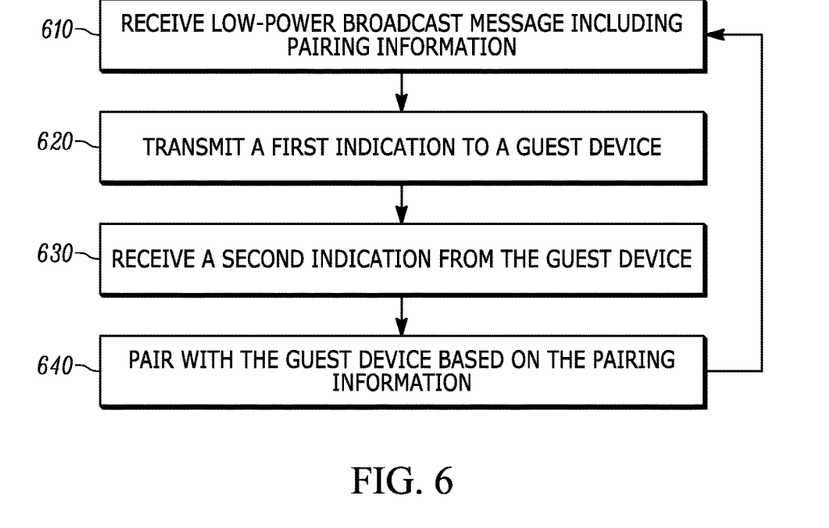
FIG. 6 is a flowchart of a method of secure zone pairing in accordance with some embodiments.

FIG. 6 is a flowchart illustrating one example method 600 of secure zone pairing. As illustrated in FIG. 6, the method 600 includes receiving, with the host device 120, the low-power broadcast message when the host device 120 is within the broadcast zone 140 of the pairing device 110 (at block 610). As described above, the low-power broadcast message includes pairing information that is used by the host device 120 to pair with the guest device 130. The host device 120 may be configured to receive the low-power broadcast message when the secure zone pairing mode is enabled.

After receiving the low-power broadcast message, the host device 120 transmits, via the host transceiver 330, a first indication that the host device 120 is within the broadcast zone 140 of the pairing device 110 (at block 620). As described above, in some embodiments, the host device 120 transmits the first indication only when the host device 120 is in the secure zone pairing mode. The host device 120 also receives, via the host transceiver 330, a second indication from the guest device 130 that the guest device 130 is within the broadcast zone 140 of the pairing device 110 (at block 630).

The host device 120 pairs with the guest device 130 based on the pairing information included in the low-power broadcast message received from the pairing device 110 and the second indication received from the guest device 130 (at block 640). As described above, the pairing is initiated when the first indication and the second indication indicate that the host device 120 and the guest device 130 are both within the broadcast zone 140. The pairing is performed by, for example, exchanging the passkey included in the pairing information.

In some embodiments, the pairing device 110 may include additional security features to notify a user when the broadcast zone 140 is not secure. For example, the pairing device 110 may scan for other devices that are capable of secure zone pairing, such as other pairing devices. The pairing device 110 may detect another pairing device (for example, a second pairing device) by detecting a low-power broadcast message from the second pairing device that includes the pairing service identifier. When the pairing device 110 determines that there are other pairing devices nearby, the pairing device 110 provides an indication (for example, a second indication) to a user that the broadcast zone 140 is not secure. The pairing device 110 notifies the user by, for example, flashing an LED on the pairing device 110, changing the color of the LED on the pairing device 110, and the like.

In some embodiments, the low-power broadcast message may also include a secure zone number. The secure zone number may be randomly generated at power up of the pairing device 110. This secure zone number may also be included in the indications transmitted by the host device 120 and the guest device 130. This will allow the host device 120 to pair with the guest device 130 only when they are both in the same secure zone created by the broadcast zone 140 of the pairing device 110.

As described above, the pairing device 110, the host device 120, and the guest device 130 may communicate with one another using Bluetooth® low-energy signals. In some embodiments, the pairing device 110, the host device 120, and the guest device 130 may use other low-power communication techniques to communicate with one another. For example, the pairing device 110, the host device 120, and the guest device 130 may use ANT™ protocol, ZigBee® protocol, and the like. In addition to communicating within the broadcast zone using low-power technologies, the pairing device 110, the host device 120, and the guest device 130 are capable of communicating with other devices (for example, device 150) using high-power communication technologies. For example, the pairing device 110, the host device 120, and the guest device 130 are capable of communicating with other devices using Bluetooth®, Wi-Fi™, and the like. Further, the pairing device 110, the host device 120, and the guest device 130 may also communicate over a communication network, such as, a cellular network, a land mobile radio (LMR) network, the Internet, and the like.

One advantage of the above techniques is that the techniques provide the similar or better security levels as using near field communication, or other out-of-band pairing mechanisms, but without requiring the end devices to have any special hardware.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a," "has . . . a," "includes . . . a," or "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially," "essentially," "approximately," "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A host device, comprising:
a transceiver;
an electronic processor electrically coupled to the transceiver and configured to:
receive, from a pairing device via the transceiver, a low-power broadcast message when the host device is within a broadcast zone of the pairing device, the low-power broadcast message including pairing information,
transmit, via the transceiver, a first indication that the host device is within the broadcast zone of the pairing device after receiving the low-power broadcast message,
receive, from a guest device via the transceiver, a second indication that the guest device is within the broadcast zone of the pairing device, and
pair with the guest device based on the pairing information of the low-power broadcast message and the second indication.

2. The host device of claim 1, wherein the pairing information includes a pairing service identifier and a passkey.

3. The host device of claim 1, wherein the low-power broadcast message is compliant with a Bluetooth Low-Energy (LE) standard.

4. The host device of claim 1, wherein the low-power broadcast message is transmitted at or below 1 milliwatt (mW).

5. A method of secure zone pairing, comprising:
receiving, with a host device, a low-power broadcast message when the host device is within a broadcast zone of a pairing device, the low-power broadcast message including pairing information;
transmitting, via a transceiver of the host device, a first indication that the host device is within the broadcast zone of the pairing device after receiving the low-power broadcast message;
receiving, via the transceiver, a second indication that a guest device is within the broadcast zone of the pairing device, and
pairing, with a processor of the host device, the host device with the guest device based on the pairing information of the low-power broadcast message and the second indication.

6. The method of claim 5, wherein the pairing information includes a pairing service identifier and a passkey.

7. The method of claim 5, wherein the low-power broadcast message is compliant with a Bluetooth Low-Energy (LE) standard.

8. The method of claim 5, wherein the low-power broadcast message is transmitted at or below 1 milliwatt (mW).

9. A system for pairing wireless devices, the system comprising:
a pairing device having a transmitter configured to transmit a low-power broadcast message within a broadcast zone having a size, the low-power broadcast message including pairing information;
a guest device having a first transceiver and configured to receive the low-power broadcast message and transmit an indication that the guest device is within the broadcast zone after receiving the low-power broadcast message;
a host device having a second transceiver and configured to receive the indication and the low-power broadcast message; and
the host device further configured to pair with the guest device based on the pairing information of the low-power broadcast message and the indication.

10. The system of claim 9, wherein the pairing information includes a pairing service identifier and a passkey.

11. The system of claim 9, wherein the pairing device is further configured to:
detect that a second pairing device is within the broadcast zone; and
generate a second indication that the broadcast zone is not secure.

12. The system of claim 9, wherein the host device is further configured to transmit a third indication that the host device is within the secure zone, and wherein the guest device is further configured to receive the third indication.

13. The system of claim 9, wherein the low-power broadcast message is compliant with a Bluetooth Low-Energy (LE) standard.

14. The system of claim 9, wherein the low-power broadcast message is transmitted at or below 1 milliwatt (mW).

15. A method of secure zone pairing, comprising:
transmitting, with a transmitter of a pairing device, a low-power broadcast message within a broadcast zone having a size, the low-power broadcast message including pairing information;
receiving, with a first transceiver of a guest device within the broadcast zone, the low-power broadcast message;
transmitting, with the first transceiver, an indication that the guest device is within the broadcast zone after receiving the low-power broadcast message;
receiving, with a second transceiver of a host device within the broadcast zone, the indication and the low-power broadcast message; and
pairing the host device with the guest device based on pairing information of the low-power broadcast message and the indication.

16. The method of claim 15, wherein the pairing information includes a pairing service identifier and a passkey.

17. The method of claim 15, further comprising:
detecting, with the pairing device, that a second pairing device is within the broadcast zone; and
generating, with the pairing device, a second indication that the broadcast zone is not secure.

18. The method of claim 15, further comprising:
transmitting, with the host device, a third indication that the host device is within the secure zone; and
receiving, with the guest device, the third indication.

19. The method of claim 15, wherein the low-power broadcast message is compliant with a Bluetooth Low-Energy (LE) standard.

20. The method of claim 15, wherein the low-power broadcast message is transmitted at or below 1 milliwatt (mW).

\* \* \* \* \*